(12) United States Patent     (10) Patent No.:   US 12,668,318 B2

Rupp                      (45) Date of Patent:     Jun. 30, 2026

(54) SPOILER FOR A VEHICLE

(71) Applicant: Honda Motor Co., Ltd., Tokyo (JP)

(72) Inventor: Timothy J Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 18/413,945

(22) Filed: Jan. 16, 2024

(65)             Prior Publication Data

US 2025/0229849 A1      Jul. 17, 2025

(51) Int. Cl.
     *B62D 35/00*         (2006.01)
     *B60Q 1/30*         (2006.01)

(52) U.S. Cl.
     CPC ............. *B62D 35/007* (2013.01); *B60Q 1/30* (2013.01)

(58) Field of Classification Search
     CPC ........ B62D 35/007; B62D 37/02; B60Q 1/30; B60Q 1/302; B60Q 1/44
     USPC ......... 296/180.1, 180.5; 244/123.1; 180/903; 362/541
     See application file for complete search history.

(56)             References Cited

U.S. PATENT DOCUMENTS

| | | | |
|---|---|---|---|
| 4,558,898 A | * | 12/1985 | Deaver ................ B62D 35/007 296/180.1 |
| 4,722,032 A | | 1/1988 | Kulka |
| 4,736,279 A | | 4/1988 | Yamai et al. |

| | | | |
|---|---|---|---|
| 5,013,081 A | * | 5/1991 | Cronce ................ B62D 35/007 296/180.1 |
| 5,289,358 A | * | 2/1994 | Halemeier .............. F21V 21/30 362/419 |
| 5,871,254 A | * | 2/1999 | Burg .................. B62D 33/0273 296/180.1 |
| 6,561,689 B1 | | 5/2003 | Kidd et al. |
| 7,220,032 B2 | | 5/2007 | Mori |

FOREIGN PATENT DOCUMENTS

| | | |
|---|---|---|
| CN | 210363576 U | 4/2020 |
| CN | 111017050 B | 1/2022 |
| CN | 115158494 A | 10/2022 |
| CN | 115352539 A | 11/2022 |
| DE | 102020202792 A1 | 9/2021 |
| WO | 2019122460 A1 | 6/2019 |

* cited by examiner

*Primary Examiner* — Stephen T Gordon
(74) *Attorney, Agent, or Firm* — Gregory J. Burke; American Honda Motor Co., Inc.

(57)             ABSTRACT

A spoiler for a vehicle has a first end and a second end and includes a first bracket, and a second bracket is arranged opposite to the first bracket with a chamber defined between the first bracket and the second bracket. An opening of the chamber defined at the second end. Moreover, A third bracket is disposed at the second end and extends between the first bracket and the second bracket. The third bracket comprises a central bracket structure arranged substantially centrally to the spoiler, covering the opening, and a pair of side bracket structures. Each side bracket structure includes a hinge portion adapted to be displaced between an open position and a closed position. In the closed position, the hinge portion covers the opening, while in the open position, the hinge portion allows access to the chamber through the opening.

20 Claims, 3 Drawing Sheets

SPOILER FOR A VEHICLE

BACKGROUND

The disclosed subject matter relates generally to a vehicle. More particularly, the disclosed subject matter relates to a spoiler for a vehicle that facilitates servicing of a stop light arranged inside the spoiler.

Spoilers are generally used on SUVs and larger vehicles to control airflow. Typically, center high mount stop lights (CHMSL) are packaged inside the spoilers. These lights sometimes require service, but it is difficult or impossible to access these lights within the spoiler. Therefore, to service the CHMSL, the entire spoiler may need to be replaced, leading to high cost for the customer.

SUMMARY

In accordance with one embodiment of the present disclosure, a spoiler for a vehicle is disclosed. The spoiler has a first end and a second end and includes a first bracket extending from the first end to the second end. The spoiler also includes a second bracket arranged opposite to the first bracket and extending from the first end to the second end. A chamber is defined between the first bracket and the second bracket with an opening of the chamber defined at the second end. Moreover, the spoiler includes a third bracket disposed at the second end and extending between the first bracket and the second bracket. The third bracket comprises a central bracket structure arranged substantially centrally, in a lateral direction, to the spoiler, covering the opening. Furthermore, the third bracket includes a pair of side bracket structures disposed on opposite sides of the central bracket structure. Each of the pair of side bracket structures includes a hinge portion adapted to be displaced between an open position and a closed position. In the closed position, the hinge portion covers the opening, preventing access to the chamber through the opening. In the open position, the hinge portion allows access to the chamber through the opening.

In accordance with another embodiment of the present disclosure, a spoiler assembly for a vehicle is disclosed. The spoiler assembly comprises a spoiler having a first end and a second end. The spoiler includes a first bracket extending from the first end to the second end, and a second bracket arranged opposite to the first bracket and extending from the first end to the second end. A chamber is defined between the first bracket and the second bracket with an opening of the chamber defined at the second end. Moreover, the spoiler includes a third bracket disposed at the second end and extending between the first bracket and the second bracket. The third bracket comprises a central bracket structure arranged substantially centrally, in a lateral direction, to the spoiler, covering the opening. The third bracket further includes a pair of side bracket structures disposed on opposite sides of the central bracket structure. Each of the pair of side bracket structures includes a hinge portion adapted to be displaced between an open position and a closed position. In the closed position, the hinge portion covers the opening, preventing access to the chamber through the opening. In the open position, the hinge portion allows access to the chamber through the opening. The spoiler assembly further includes a stop light arranged inside the chamber and disposed proximate to the first end of the spoiler.

In accordance with yet a further embodiment of the present disclosure, a vehicle is disclosed. The vehicle includes a vehicle body having a tail gate, and a spoiler having a first end and a second end coupled to the tail gate. The spoiler comprises a first bracket extending from the first end to the second end, and a second bracket arranged opposite to the first bracket and extending from the first end and the second. A chamber is defined between the first bracket and the second bracket with an opening of the chamber defined at the second end. The spoiler further includes a third bracket disposed at the second end and extending between the first bracket and the second bracket. The third bracket comprises a central bracket structure arranged substantially centrally, in a lateral direction, to the spoiler, covering the opening. The third bracket also includes a pair of side bracket structures disposed on opposite sides of the central bracket structure. Each of the pair of side bracket structures includes a hinge portion adapted to be displaced between an open position and a closed position. In the closed position, the hinge portion covers the opening, preventing access to the chamber through the opening. In the open position, the hinge portion allows access to the chamber through the opening. The vehicle also includes a stop light arranged inside the chamber and disposed proximate to the first end of the spoiler.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
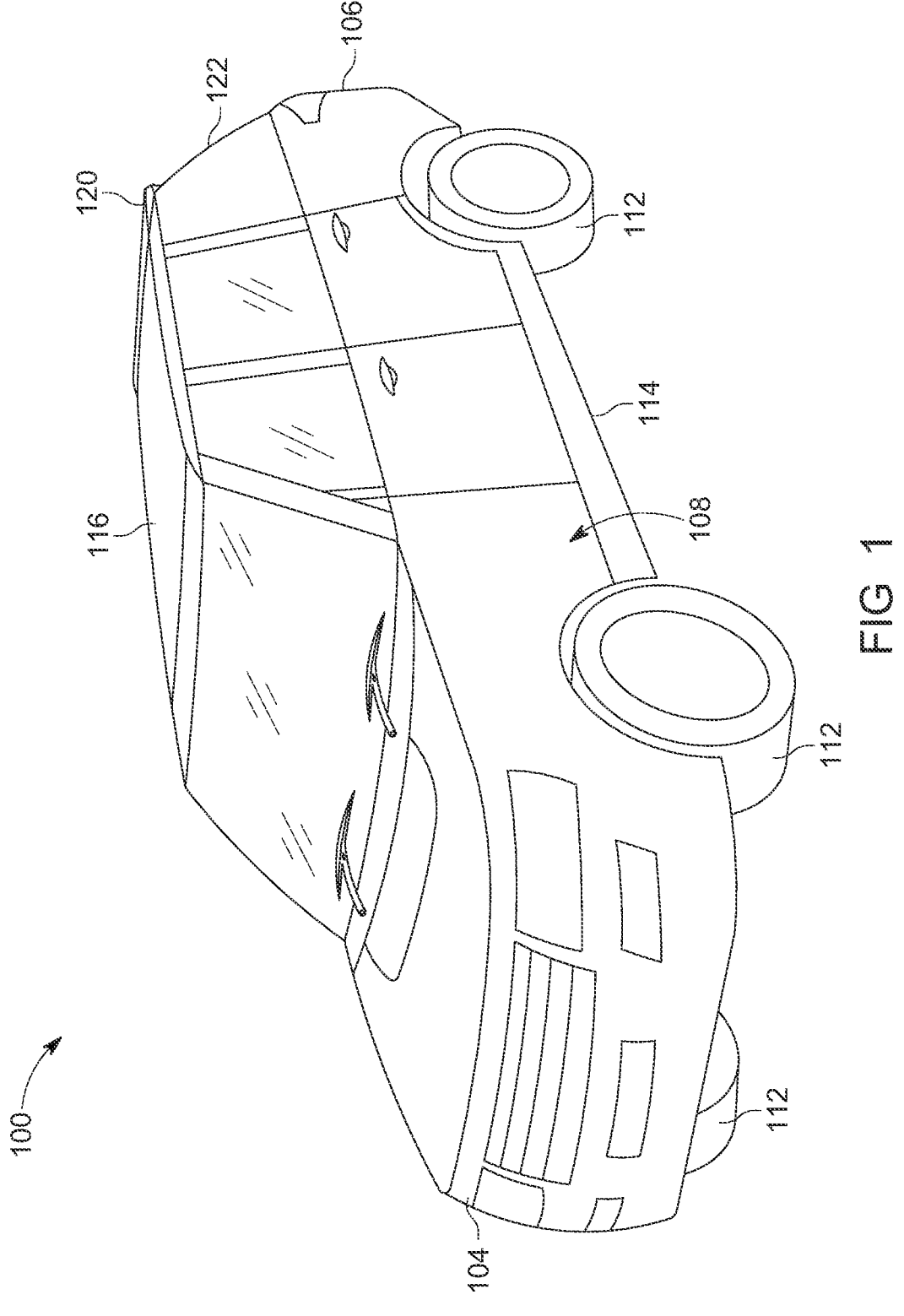
FIG. 1 is a perspective view of a vehicle having a spoiler assembly, in accordance with one embodiment of the present disclosure.

FIG. 1 illustrates a perspective view of a vehicle 100, in accordance with one embodiment of the present disclosure. As shown, the vehicle 100 includes a front end 104, a rear end 106, and a vehicle body 108 extending from the front end 104 to the rear end 106 and defining a passenger compartment for facilitating a seating of one or more passenger inside the vehicle 100. Further, the vehicle 100 includes a plurality of wheels 112 supporting the vehicle body 108 on a surface and enables a movement of the vehicle 100 over the surface. As shown, the vehicle body 108 includes a floor 114 on which one or more seats are mounted and a roof 116 arranged opposite to the floor 114 and supported on a plurality of pillars of the vehicle body 108. Further, the vehicle 100 includes a spoiler assembly 120 coupled to a tail gate 122 of the vehicle 100 and arranged at a top edge of the tail gate 122.

Figure 2:
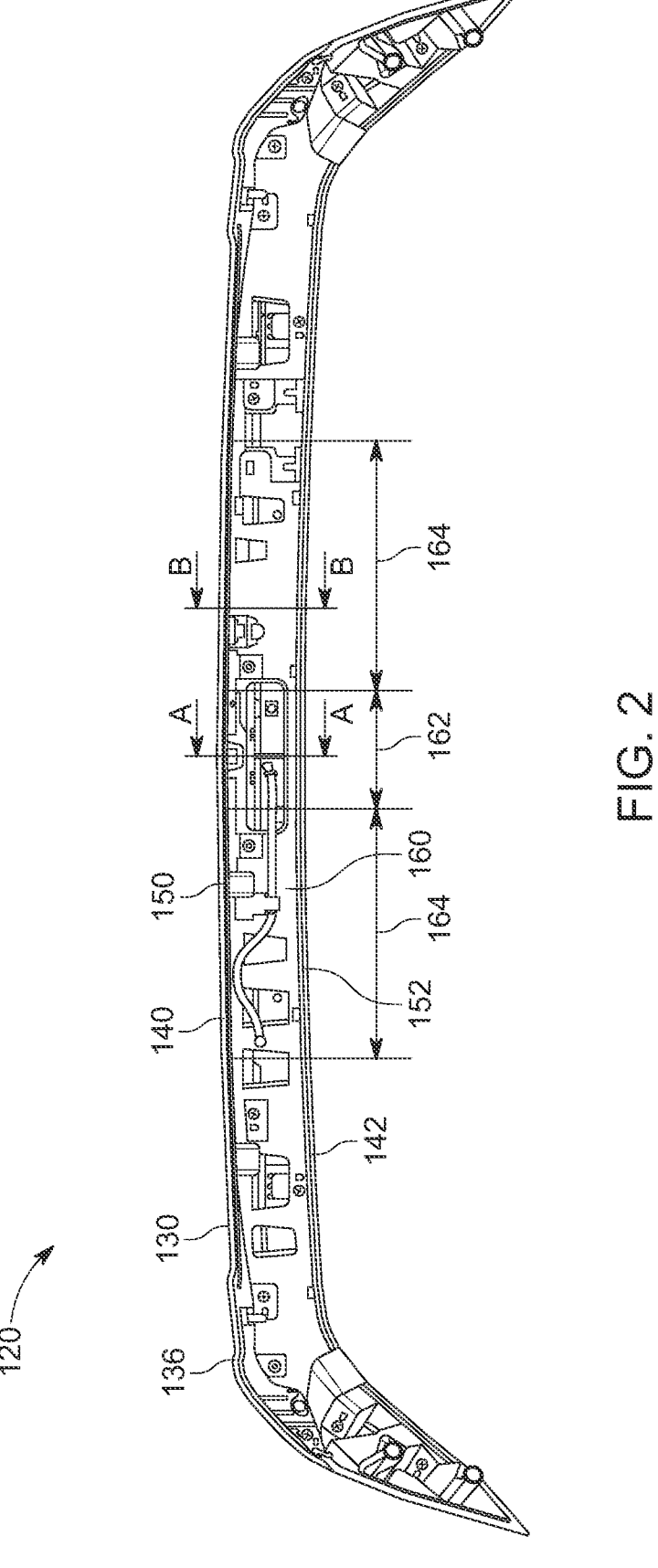
FIG. 2 is a rear perspective view of the spoiler assembly of FIG. 1, in accordance with one embodiment of the present disclosure.
Figure 3:
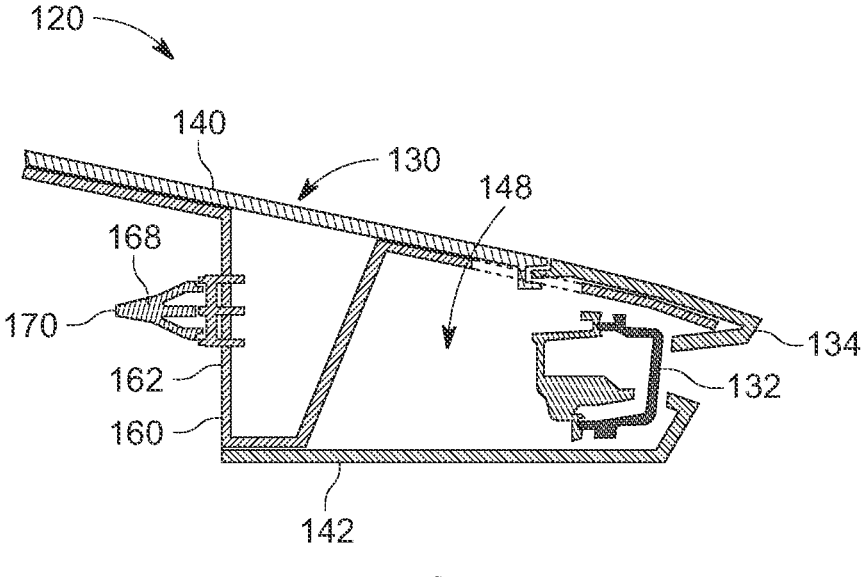
FIG. 3 is a sectional view of the spoiler assembly of FIG. 2 along section line A-A, in accordance with one embodiment of the present disclosure.
Figure 4:
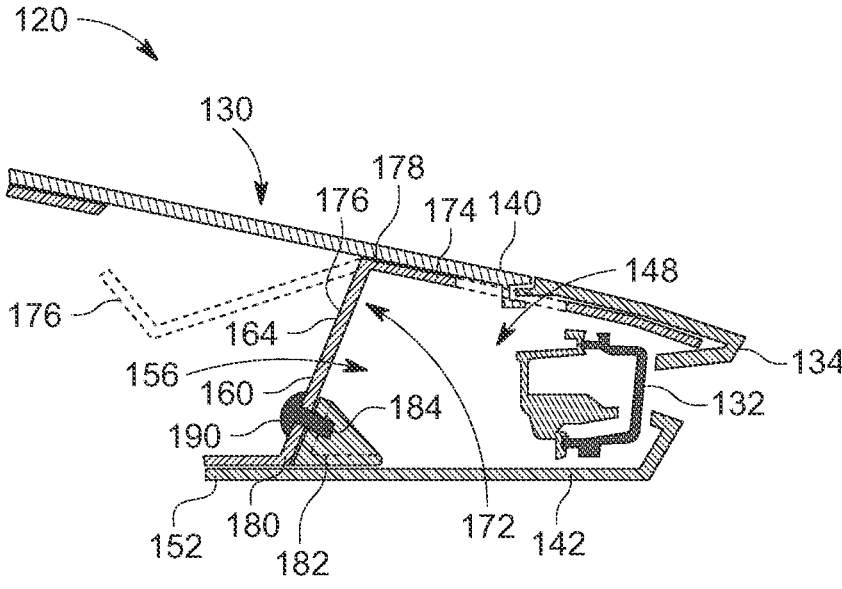
FIG. 4 is a sectional view of the spoiler assembly of FIG. 2 along section line B-B, in accordance with one embodiment of the present disclosure.

Referring to FIGS. 2 to 4, the spoiler assembly 120 includes a spoiler 130 to guide an air flow along a rear of the vehicle 100, and a stop light 132 (shown in FIGS. 3 and 4) mounted to the spoiler 130 and configured to indicate a braking of the vehicle 100. The stop light 132 is configured to illuminate upon braking of the vehicle and/or during a reversing of the vehicle. As shown, the stop light 132 is arranged substantially centrally, in the lateral direction, of the spoiler 130.

Moreover, the spoiler 130 includes a first end 134 (i.e., rear end 134) extending rearwardly, in the longitudinal direction of the vehicle 100, from the tail gate 122, and second end 136 (i.e., front end 136) disposed forwardly, in the longitudinal direction of the vehicle 100, from the rear end 134. The spoiler 130 includes a first bracket 140 (i.e., upper bracket 140) extending from the front end 136 to the rear end 134 and a second bracket 142 (i.e., lower bracket 142) extending from the front end 136 to the rear end 134. The upper bracket 140 and the lower bracket 142 are arranged such that a chamber 148 is defined between the upper bracket 140 and the lower bracket 142. Also, the upper bracket 140 and the lower bracket 142 are structured and arranged such that upper bracket 140 and the lower bracket 142 define at least a portion of two sides of a triangle with a vertex of the triangle being arranged proximate to or at the rear end 134 of the spoiler 130. Accordingly, the spoiler 130 includes a desired aerodynamic shape to guide an airflow along the vehicle body 108.

Further, a front edge 150 of the upper bracket 140 and a front edge 152 of the lower bracket 142 are arranged separated from each other in a vertical direction. Accordingly. an opening 156 of the chamber 148 is defined at the front end 136 of the spoiler 130 between the front edges 150, 152 of the upper bracket 140 and the lower bracket 142. To cover the opening 156 and hence the chamber 148 at the front end 136, the spoiler 136 includes an inner bracket 160 (i.e., third bracket 160). As shown, the inner bracket 160 includes a central bracket structure 162 arranged substantially centrally to the spoiler 130 and a pair of side brackets structures 164 arranged on both sides of the central bracket structure 162. The central bracket structure 162 is fixedly attached to the upper bracket 140 and the lower bracket 142, and includes a datum structure 168, for example, a datum pin 170, shown in FIG. 3, configured to be inserted inside a corresponding datum hole (not shown) of the tail gate 122 of the vehicle 100. The datum structure 168 enables a correct positioning and orientation of the spoiler 130 i.e., spoiler assembly 120 relative to the tail gate 122 and hence facilitates the correct/desired assembly of the spoiler 130 with the tailgate 122.

Further, the pair of side bracket structures 164 are structures to enable replacement of the stop light 132 without having to replace the entire spoiler assembly 120 when the stop light 130 is damaged or not functioning as desired. It may be appreciated that the pair of side bracket structures 164 is similar in structure, construction, assembly, and functionality, and therefore, for the sake of clarity and brevity, the structure, the construction, the assembly, and the functionality of only one side bracket structure 164 is explained in detail.

As shown in FIG. 4, the side bracket structure 164 includes a hinge portion 172 adapted/arranged to be moved/ displaced between a first position (i.e., open position), shown in dotted line in FIG. 4, and a second position (i.e., closed position), as shown in solid lines in FIG. 4. In the open position, the hinge portion 172 allows the access to the chamber 148 through the opening 156, while in the closed position, the hinge portion 172 is arranged completely covering the opening 156, therefore preventing access to the chamber 148 through the opening 156. As shown, the hinge portion 172 is a living hinge and includes a first elongated member 174 and a second elongated member 176 having a first end 178 pivotally coupled/hinged to the first elongated member 174 and a second end 180 adapted to be selectively coupled/engaged/secured to the lower bracket 142. As shown, the first end 178 of the second elongated member 176 is arranged proximate to the upper bracket 140, and the second elongated member 176 extends in a vertical direction when arranged in the closed position.

Moreover, as shown in FIG. 4, to retain the second elongated member 176 and hence the hinge portion 172 coupled to the lower bracket 142 in the closed position, the lower bracket 142 includes a connector 180 defining a hole 184, that may be a threaded hole, to removably secure the second elongated member 176 with the lower bracket 142 via a fastener 190. Accordingly, the hinge portion 172 is moved to the open position by removing the fastener 190 and displacing the second elongated member 176 relative to the first elongated member 174. In this manner, by moving the hinge portion to the open position, a user/technician accesses the chamber 148 through the opening 156 and removes the stop light 132 and replaces the stop light 132 with a new stop light.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A spoiler for a vehicle and having a first end and a second end, the spoiler comprising:
   a first bracket extending from the first end to the second end;
   a second bracket arranged opposite to the first bracket and extending from the first end to the second end, wherein a chamber is defined between the first bracket and the second bracket with an opening of the chamber defined at the second end; and
   a third bracket disposed at the second end and extending between the first bracket and the second bracket, the third bracket comprises
      a central bracket structure arranged substantially centrally, in a lateral direction, to the spoiler, covering the opening,
      a pair of side bracket structures disposed on opposite sides of the central bracket structure, each of the pair of side bracket structures includes a hinge portion adapted to be displaced between an open position and a closed position, wherein in the closed position, the hinge portion covers the opening, preventing access to the chamber through the opening, and in the open position, the hinge portion allows access to the chamber through the opening.

2. The spoiler of claim 1, wherein the second bracket includes a connector configured to facilitate securing of the hinge portion with the second bracket in the closed position.

3. The spoiler of claim 2, wherein the connector includes a hole and the spoiler includes a fastener adapted to extend inside the hole through the hinge portion to removably couple the hinge portion with the second bracket.

4. The spoiler of claim 3, wherein the hinge portion includes a first elongated member attached to the first bracket, and a second elongated member pivotally coupled to the first elongated member and extending in a vertical direction from the first bracket to the second bracket, covering the opening, in the closed position of the hinge portion.

5. The spoiler of claim 4, wherein the second elongated member is secured to the connector via the fastener.

6. The spoiler of claim 1, wherein the hinge portion defines a living hinge.

7. The spoiler of claim 4, wherein in the open position, the second elongated member is arranged away from the opening, providing access to the chamber through the opening.

8. A spoiler assembly for a vehicle, comprising:
a spoiler having a first end and a second end, the spoiler comprises:
a first bracket extending from the first end to the second end;
a second bracket arranged opposite to the first bracket and extending from the first end to the second end, wherein a chamber is defined between the first bracket and the second bracket with an opening of the chamber defined at the second end; and
a third bracket disposed at the second end and extending between the first bracket and the second bracket, the third bracket comprises
a central bracket structure arranged substantially centrally, in a lateral direction, to the spoiler, covering the opening, and
a pair of side bracket structures disposed on opposite sides of the central bracket structure, each of the pair of side bracket structures includes a hinge portion adapted to be displaced between an open position and a closed position, wherein
in the closed position, the hinge portion covers the opening, preventing access to the chamber through the opening, and
in the open position, the hinge portion allows access to the chamber through the opening; and
a stop light arranged inside the chamber and disposed proximate to the first end of the spoiler.

9. The spoiler assembly of claim 8, wherein the second bracket includes a connector configured to facilitate securing of the hinge portion with the second bracket in the closed position.

10. The spoiler assembly of claim 9, wherein the connector includes a hole and the spoiler includes a fastener adapted to extend inside the hole through the hinge portion to removably couple the hinge portion with the second bracket.

11. The spoiler assembly of claim 10, wherein the hinge portion includes a first elongated member attached to the first bracket, and a second elongated member pivotally coupled to the first elongated member and extending in a vertical direction from the first bracket to the second bracket, covering the opening, in the closed position of the hinge portion.

12. The spoiler assembly of claim 11, wherein the second elongated member is secured to the connector via the fastener.

13. The spoiler assembly of claim 8, wherein the hinge portion defines a living hinge.

14. The spoiler assembly of claim 11, wherein in the open position, the second elongated member is arranged away from the opening, providing access to the chamber through the opening to enable a removal of the stop light from the chamber.

15. A vehicle, comprising:
a vehicle body having a tail gate;
a spoiler having a first end and a second end coupled to the tail gate, the spoiler comprises:
a first bracket extending from the first end to the second end;
a second bracket arranged opposite to the first bracket and extending from the first end to the second end, wherein a chamber is defined between the first bracket and the second bracket with an opening of the chamber defined at the second end; and
a third bracket disposed at the second end and extending between the first bracket and the second bracket, the third bracket comprises
a central bracket structure arranged substantially centrally, in a lateral direction, to the spoiler, covering the opening, and
a pair of side bracket structures disposed on opposite sides of the central bracket structure, each of the pair of side bracket structures includes a hinge portion adapted to be displaced between an open position and a closed position, wherein
in the closed position, the hinge portion covers the opening, preventing access to the chamber through the opening, and
in the open position, the hinge portion allows access to the chamber through the opening; and
a stop light arranged inside the chamber and disposed proximate to the first end of the spoiler.

16. The vehicle of claim 15, wherein the second bracket includes a connector configured to facilitate securing of the hinge portion with the second bracket in the closed position.

17. The vehicle of claim 16, wherein the connector includes a hole and the spoiler includes a fastener adapted to extend inside the hole through the hinge portion to removably couple the hinge portion with the second bracket.

18. The vehicle of claim 17, wherein the hinge portion includes a first elongated member attached to the first bracket, and a second elongated member pivotally coupled to the first elongated member and extending in a vertical direction from the first bracket to the second bracket, covering the opening, in the closed position of the hinge portion.

19. The vehicle of claim 18, wherein the second elongated member is secured to the connector via the fastener.

20. The vehicle of claim 18, wherein in the open position, the second elongated member is arranged away from the opening, providing access to the chamber through the opening to enable a removal of the stop light from the chamber.

* * * * *